United States Patent
Grosskopf et al.

(10) Patent No.: US 9,732,804 B2
(45) Date of Patent: Aug. 15, 2017

(54) DISCONNECT SHAFT FOR AN INTEGRATED DRIVE GENERATOR (IDG)

(71) Applicant: Hamilton Sundstrand Corporation, Charlotte, NC (US)

(72) Inventors: Andrew P. Grosskopf, Rockford, IL (US); Aaron M. Finke, Janesville, WI (US); Duane C. Johnson, Beloit, WI (US); William B. Beard, Rockford, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 14/685,957

(22) Filed: Apr. 14, 2015

(65) Prior Publication Data
US 2016/0305491 A1  Oct. 20, 2016

(51) Int. Cl.
  *F16D 7/04* (2006.01)
  *F16D 11/14* (2006.01)
  *F16D 1/02* (2006.01)
  *F16C 3/02* (2006.01)
  *F16D 11/00* (2006.01)

(52) U.S. Cl.
  CPC .............. *F16D 11/14* (2013.01); *F16C 3/02* (2013.01); *F16D 1/02* (2013.01); *F16D 2011/008* (2013.01)

(58) Field of Classification Search
  CPC ..................... F16D 11/14; F16D 2011/008
  USPC ................ 464/38, 39; 310/78; 60/484, 485; 192/69
  See application file for complete search history.

(56) References Cited

U.S. PATENT DOCUMENTS

| | | | |
|---|---|---|---|
| 3,441,116 A * | 4/1969 | Quenneville | F02C 7/275 192/69.2 X |
| 4,244,455 A | 1/1981 | Loker | |
| 4,610,558 A | 9/1986 | Erickson | |
| 4,856,633 A | 8/1989 | Specht | |
| 4,997,072 A | 3/1991 | Lapthorne | |
| 5,031,740 A | 7/1991 | Deichstetter et al. | |
| 5,103,949 A | 4/1992 | Vanderzyden et al. | |
| 7,182,193 B2 | 2/2007 | Howard | |
| 7,946,403 B2 * | 5/2011 | Burke | F16D 11/04 192/69.8 X |

(Continued)

OTHER PUBLICATIONS

Europpean Search Report and Communication; Application No. 16164751.6-1760; Dated Aug. 22, 2016; 8 pages.

*Primary Examiner* — Gregory Binda
(74) *Attorney, Agent, or Firm* — Cantor Colburn LLP

(57) ABSTRACT

A disconnect shaft of an integrated drive generator is provided including a body configured to rotate about an axis of rotation. The body has a first end, a second opposite end, and a plurality of teeth formed adjacent the first end and configured to engage a complementary portion of an adjacent component. A relief is formed in the body such that a first portion is defined between the relief and the plurality of teeth. The first portion includes a plurality of threads having at least one of a major diameter between about 1.3044 and about 1.3125 inches (3.313-3.334 centimeters), a minor diameter between about 1.2482 and about 1.2547 inches (3.170-3.187 centimeters), a pitch diameter between about 1.2765 and about 1.2800 inches (3.242-3.251 centimeters), and a root radius between about 0.0075 and 0.0090 inches (0.0190-0.0029 centimeters).

12 Claims, 9 Drawing Sheets

(56) References Cited

U.S. PATENT DOCUMENTS

| | | |
|---|---|---|
| 8,162,122 B2 | 4/2012 | Turner et al. |
| 8,237,298 B2 * | 8/2012 | Lemmers, Jr. .......... F16D 11/14 |
| | | 192/66.1 |
| 8,795,130 B2 | 8/2014 | Forrest |
| 8,963,391 B2 | 2/2015 | Grosskopf |
| 2012/0211321 A1 | 8/2012 | Harrison et al. |
| 2013/0178323 A1 | 7/2013 | Ekonen et al. |
| 2014/0008170 A1 | 1/2014 | Vanderzyden et al. |

* cited by examiner

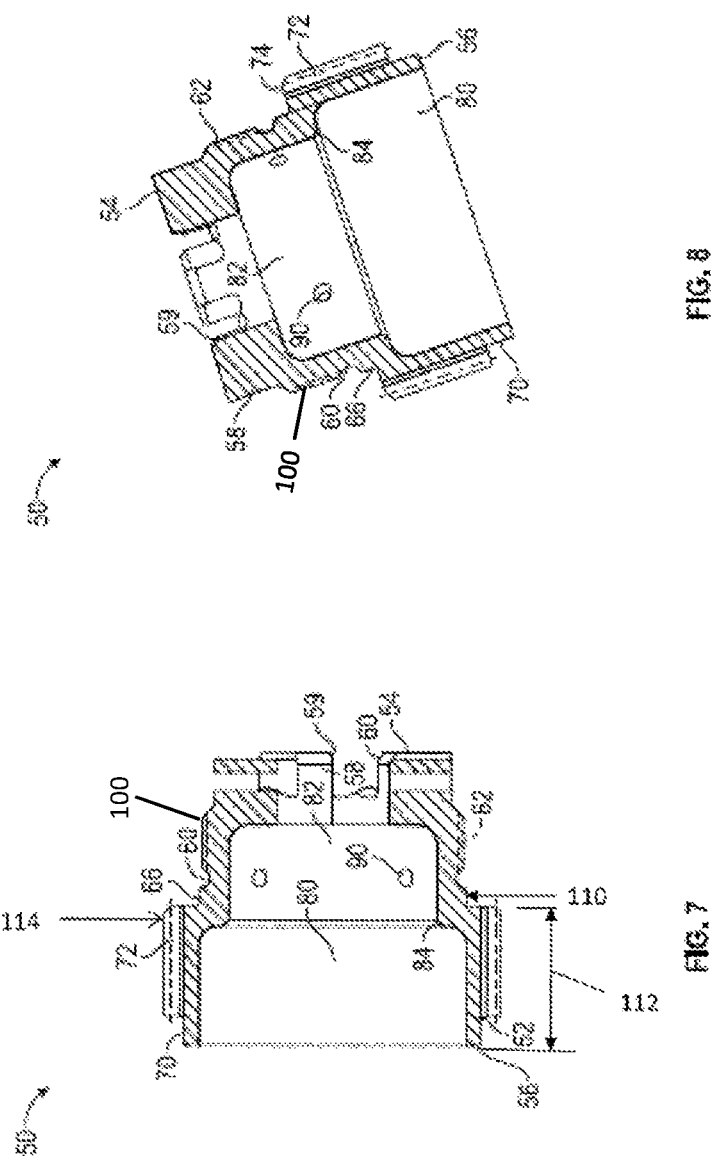

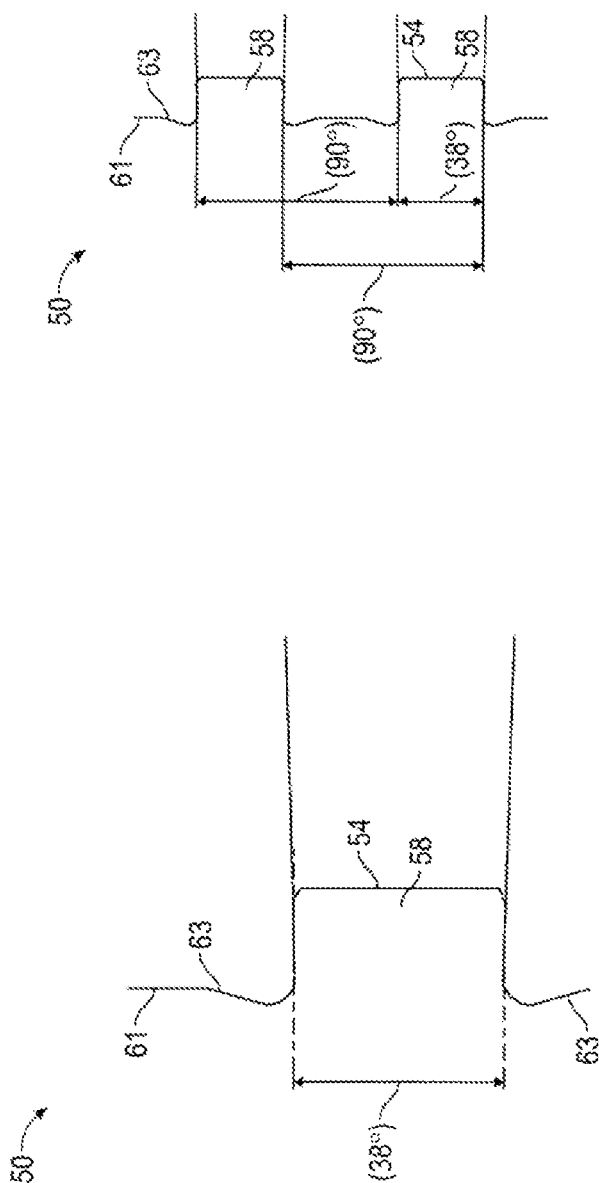

DISCONNECT SHAFT FOR AN INTEGRATED DRIVE GENERATOR (IDG)

BACKGROUND OF THE INVENTION

Exemplary embodiments of this invention generally relate to an integrated drive generator, and more particularly, to a disconnect shaft of an integrated drive generator.

Aircrafts currently rely on electrical, pneumatic, and hydraulic systems for secondary power. A typical electrical system utilizes an integrated drive generator (IDG) coupled to each engine to provide a fixed frequency power to the distribution system and loads. One type of IDG includes a generator, a hydraulic unit, and a differential assembly arranged in a common housing. The differential assembly is operably coupled to a gas turbine engine via an input shaft. The rotational speed of the input shaft varies during the operation of the gas turbine engine. The hydraulic unit cooperates with the differential assembly to provide a constant speed to the generator throughout engine operation.

Due to packaging constraints, components of the IDG power gear train must be redesigned.

BRIEF DESCRIPTION OF THE INVENTION

According to one embodiment of the invention, a disconnect shaft is provided including a body configured to rotate about an axis of rotation. The body has a first end, a second opposite end, and a plurality of teeth formed adjacent the first end and configured to engage a complementary portion of an adjacent component. A relief is formed in the body such that a first portion is defined between the relief and the plurality of teeth. The first portion includes a plurality of threads having at least one of a major diameter between about 1.3044 and about 1.3125 inches (3.313-3.334 centimeters), a minor diameter between about 1.2482 and about 1.2547 inches (3.170-3.187 centimeters), a pitch diameter between about 1.2765 and about 1.2800 inches (3.242-3.251 centimeters), and a root radius between about 0.0075 and 0.0090 inches (0.0190-0.0029 centimeters).

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

FIG. 7 is a section view of the disconnect shaft of FIG. 5 taken along line A-A according to an embodiment of the invention;

FIG. 8 is a section view of the disconnect shaft of FIG. 5 taken along line B-B according to an embodiment of the invention;

FIG. 10 is a section view of the disconnect shaft of FIG. 5 taken along line D-D according to an embodiment of the invention;

FIG. 11 is a section view of the disconnect shaft of FIG. 5 taken along line E-E according to an embodiment of the invention.

The detailed description explains embodiments of the invention, together with advantages and features, by way of example with reference to the drawings.

DETAILED DESCRIPTION OF THE INVENTION

Figure 1:
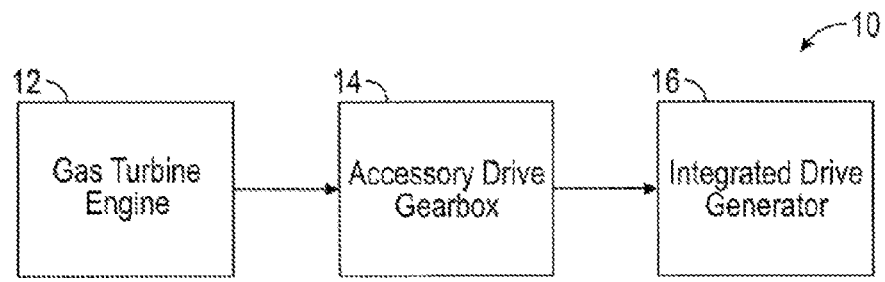
FIG. 1 is a schematic diagram of a generator system of an aircraft.

Referring now to FIG. 1, an example of a generator system 10 is schematically illustrated. The system 10 includes a gas turbine engine 12 that provides rotational drive to an integrated drive generator (IDG) 16 through an accessory drive gearbox 14 mounted on the gas turbine engine 12. The accessory drive gearbox 14 is coupled to a spool of the engine 12, and the speed of the spool varies throughout the entire engine operation.

Figure 2:
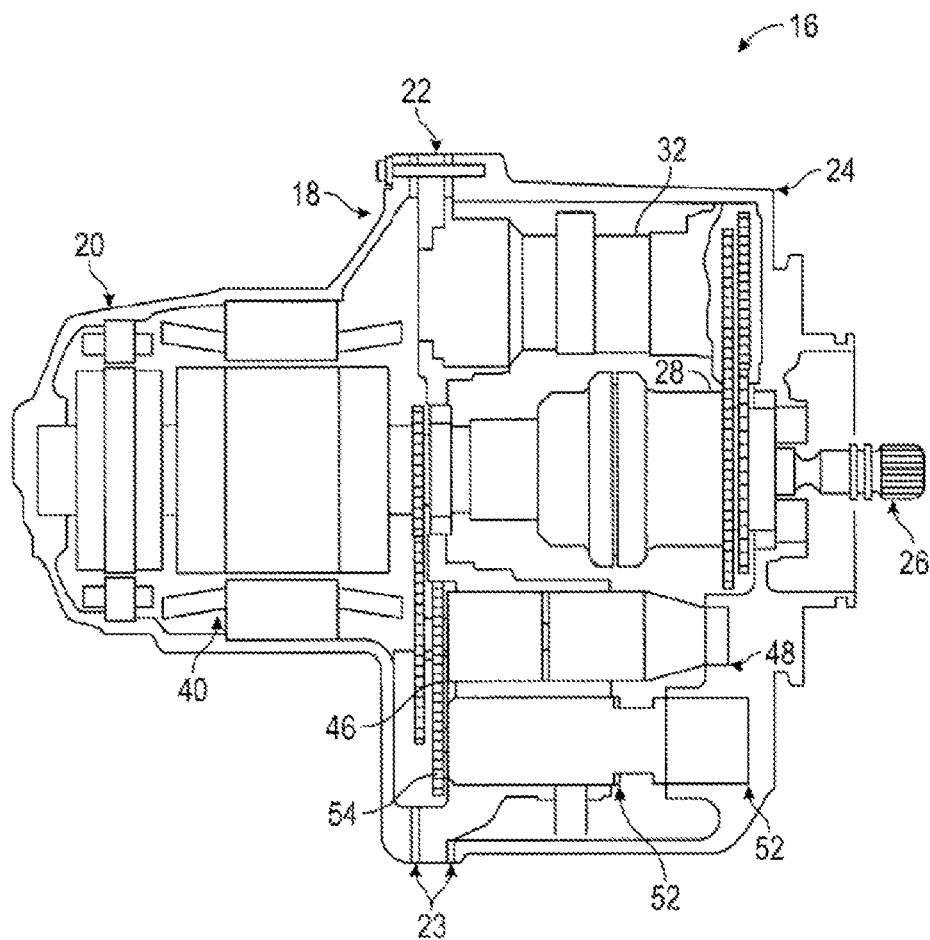
FIG. 2 is a cross-sectional schematic view of an example of an integrated drive generator (IDG)
Figure 3:
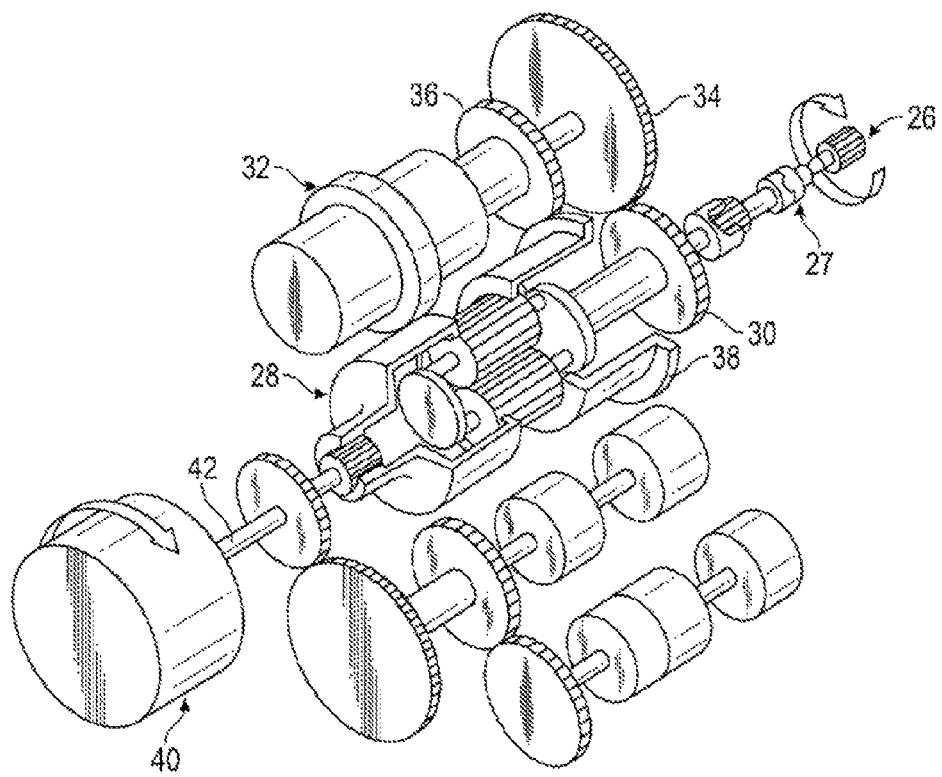
FIG. 3 is schematic view of a generator, a hydraulic unit, and a differential assembly of the integrated drive generator shown in FIG. 2.
Figure 4:
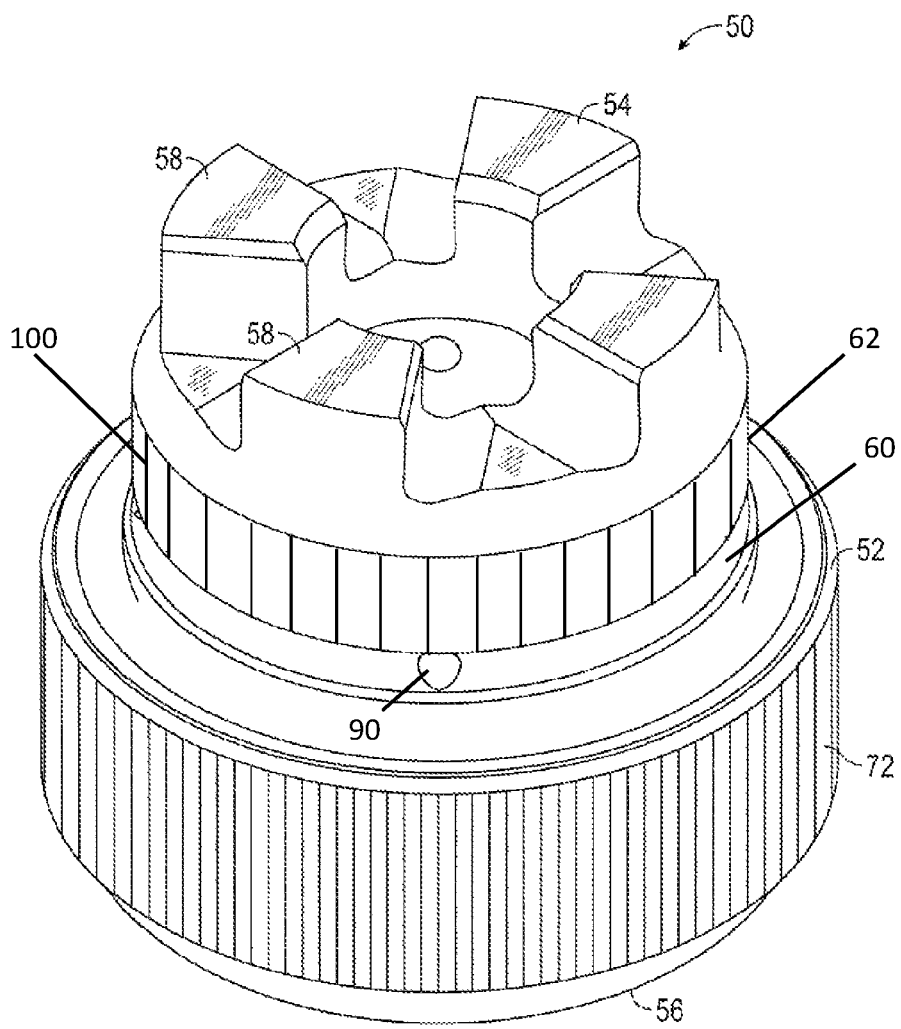
FIG. 4 is a perspective view of a disconnect shaft of the differential assembly according to an embodiment of the invention.
Figure 5:
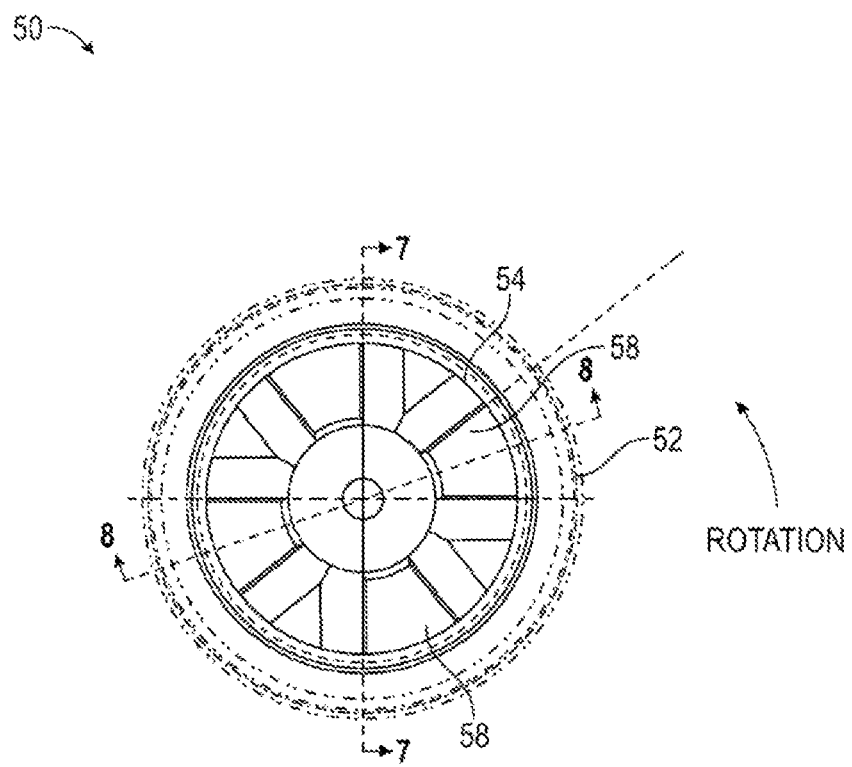
FIG. 5 is a top view of the disconnect shaft of FIG. 4 according to an embodiment of the invention.

Referring now to FIGS. 2 and 3, and example of an IDG 16 is illustrated in more detail. As shown, the IDG includes a housing 18 having generator, center, and input housing portion 20, 22, 24 secured to one another. A generator 40 is arranged in the generator housing portion 20. Seal plates 23 are provided on either side of the center housing 22 to seal the center housing 22 relative to the generator and input housing portions 20, 24.

An input shaft 26 receives rotational drive from the accessory drive gearbox 14. The rotational speed of the input shaft 26 varies depending upon the operation of the engine 12. To this end, as a result, a hydraulic unit 32 cooperates with the differential assembly 28 to convert the variable rotational speed from the input shaft 26 to provide a fixed rotational output speed to the generator 40.

The input shaft 26 rotationally drives a differential input gear 30 that is coupled to a hydraulic input gear 34 of the hydraulic unit 32. The differential input gear 30 is operably coupled to the input shaft 26 by a disconnect assembly 27. The disconnect assembly contains a disconnect shaft to be discussed later. The hydraulic output gear 36 is coupled to a differential trim gear 38. The hydraulic unit 32 increases or decreases the rotational speed provided to the differential assembly 28 from the hydraulic output gear 36 to provide a fixed rotational output speed. The variable rotational speed of the differential input gear 30 combines with the speed of the differential trim gear 38 to provide a fixed rotational speed to a generator input shaft 42.

Referring now to FIGS. 4-8, a disconnect shaft 50 of the disconnect assembly 27 is illustrated in more detail. The disconnect shaft 50 may be formed from a metal material, such as steel for example, and includes a generally cylindrical, non-uniform body 52 having a first end 54 and a second, opposite end 56. The first end 54 of the disconnect shaft 50 includes a plurality of teeth 58 configured to engage a plurality of complementary teeth (not shown) of the input shaft 26. Together, the plurality of teeth 58 defines an outer diameter of about 1.200±0.005 inches (3.048±0.0127 centimeters) and an inner diameter about 0.567±0.001 inches (1.440±0.00254 centimeters) of the first end 54 of the shaft 50.

In the illustrated, non-limiting embodiment, the plurality of teeth 58 are substantially identical. As shown, the shaft 50 includes four teeth, and a first surface of adjacent teeth is separated by 90°. Each tooth 58 may be configured to extend over about 38°±1° of the outer diameter. A chamfer 59 may be formed at the edge of the teeth 58 defining the inner diameter. In one embodiment, the chamfer 59 extends outwardly at an angle of about 30°±2° such that the diameter of the chamfer 59 at the first end 54 of the shaft 50 is about 0.627±0.015 inches (1.593±0.0381 centimeters). As is visible in the sectional, rollout views of the plurality of teeth 58 illustrated in FIGS. 10 and 11, a radius of about 0.047±0.005 inches (0.119±0.0127 centimeters) is formed adjacent the opposing sides of each tooth 56. A planar surface 62 extending between the plurality of teeth 58 is spaced from the first end 54 of the teeth 58, parallel to an axis of rotation X of the shaft 50, by about 0.188±0.003 inches (0.478±0.0076 centimeters). The planar surface 61 may be spaced from a side of the tooth 58 by a distance of about 0.167 inches (0.424 centimeters). An angled surface 63 connects the planar surface 61 with the radius adjacent the side of each tooth 58. In one embodiment, the angled surface 63 extends at a length parallel to the axis of rotation X of the shaft 50 of about 0.031±0.010 inches (0.079±0.0254 centimeters).

Figure 9:
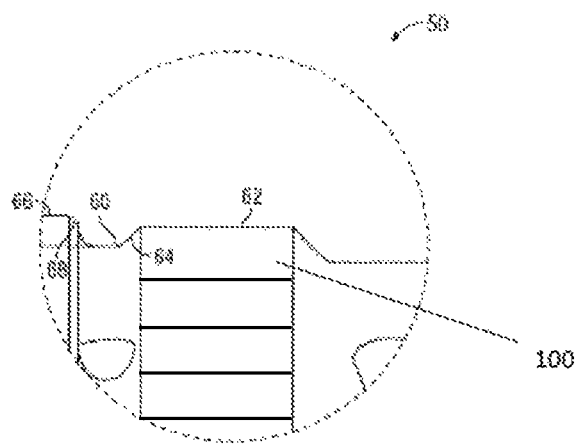
FIG. 9 is a detailed view of section C of the disconnect shaft of FIG. 6 according to an embodiment of the invention.
Figure 9A:
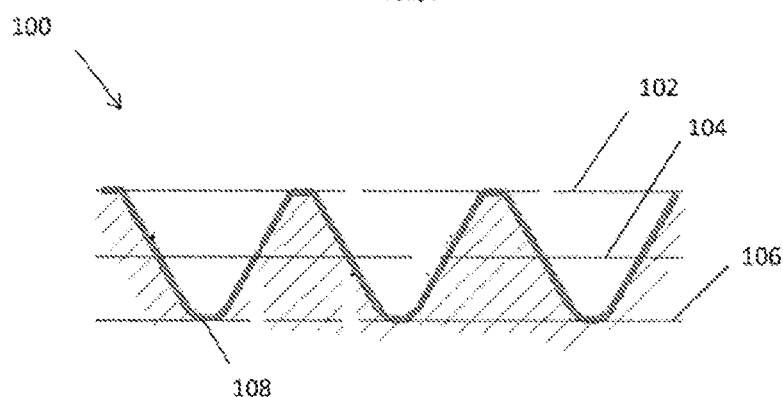
FIG. 9A is a detailed view of a thread portion of the disconnect shaft.

A relief 60 is formed about the circumference of the shaft 50 near the first end 54 to define a first portion 62 extending there between. An outer diameter of the body within the relief 60 is about 1.250±0.010 inches (3.175±0.0254 centimeters). A chamfer 64 (FIG. 9) may be formed at the intersection of the relief 60 and the first portion 62 having an angle of about 45°±2°. In one embodiment, the first portion 62 of the body 50 includes a plurality of threads 100 configured to couple to another component, such as a disconnect ramp shaft for example. In one embodiment, the plurality of threads 100 have a major diameter 102 between about 1.3044 and 1.3125 inches (3.313-3.334 centimeters), a pitch diameter 104 between about 1.2765 and 1.2800 inches (3.242-3.251 centimeters), a minor diameter 106 between about 1.2482 and 1.2547 inches (3.170-3.187 centimeters), and a root radius 108 of about 0.0075 and 0.0090 inches (0.0190-0.0029 centimeters).

A second portion 66 of the shaft 50 is disposed adjacent the relief 60, opposite the first threaded portion 62. As shown, an outer diameter 110 of the second portion 66 is about 1.350+0.001−0.000 inches (3.429+0.00254−0.000 centimeters). A chamfer 68 may also be formed at the edge of the second portion 66 adjacent the relief 60. In one embodiment, the chamfer 68 extends at an angle of about 45°±5° such that a diameter directly adjacent the relief 60 is about 1.320±0.010 inches (3.353±0.0254 centimeters). An axial distance between the near edges of chamfers 64 and 68 may be about 0.070±0.010 inches (0.1178±0.0254 centimeters).

A third portion 70 of the shaft 50 extends from adjacent the second portion 66 to the second end 56. An axial length 112 of the third portion 70, parallel to a rotational axis of the shaft 50, is about 0.697±0.005 inches (1.770±0.0127 centimeters). In one embodiment, an outer diameter 114 of the third portion 70 adjacent the second end 56 of the shaft 50 is about 1.500±0.005 inches (3.81±0.0127 centimeters). A plurality of outwardly extending splines 72 are formed in the third portion 70 of the shaft 50, adjacent the second portion 66. In one embodiment, the first splines 72 are constructed as detailed in Table 1.

TABLE 1

| External Spline Dimensions | |
|---|---|
| Data for External Involute Splines | |
| Type | Fillet Root Side Fit |
| Class | D |
| Pitch Diameter | 1.650 in |
| No. of Teeth | 33 |
| Pitch Fraction | 20/40 |
| Base Circle Diameter | 1.4289 in |
| Pressure Angle | 30° |
| Max Form Diameter | 1.600 in |
| Min Dim. Over Two Wires | 1.7827 in |
| Wire Size | .0960 in |
| Major Diam | 1.700 + .000 − .005 in |
| Minor Diam | 1.550 + .000 − .015 in |
| Additional Reqs when Max effective size is not gaged | |
| Max Profile Variation | .0010 in |
| Max Lead Variation | .0003 in |
| Circular Tooth Thickness Max Actual | .0713 in |
| Circular Tooth Thickness Min Actual | .0693 in |
| Max Diam Over Two Wires | 1.7860 in |
| Max Index Variation | .0015 in |

The plurality of splines 72 may be positioned within the third portion 70 such that a first surface 74 of the splines 72 is separated from the near edge of chamfer 64 by an axial distance of about 0.166±0.010 inches (0.422±0.0254 centimeters), and is separated from the first end 54 of the shaft 50 by an axial distance of about 0.766±0.003 inches (1.946±0.0076 centimeters). An axial length of the splines 72, parallel to the rotational axis X, is about 0.547±0.005 inches (1.389±0.0127 centimeters). In addition, a radius of about 0.010±0.005 inches (0.0254±0.0127 centimeters) may be arranged at the intersection between the first surface 74 of the splines 72 and the second portion 66.

The shaft 50 has a non-uniform, substantially hollow interior. A first opening 80 formed in the shaft 50 extends an axial distance of about 0.597±0.010 inches (1.516±0.0254 centimeters) from the second end 56 and defines an inner diameter within the third portion 70 of about 1.350±0.010 inches (3.429±0.0254 centimeters). A second opening 82 formed in the shaft 50 adjacent the first opening 80 has a diameter of about 1.050±0.010 inches (2.667±0.0254 centimeters) and extends an axial distance of about 1.106±0.010 inches (2.809±0.0254 centimeters) from the second end 56. The interior corners of one or both of the first and second opening 80, 82 may include a radius of about 0.090±0.010 inches (0.2286±0.0254 centimeters). In addition, a chamfer 84 having an angle of about 45°±5° and defining an inner diameter of about 1.110±0.015 inches (2.819±0.0254 centimeters) may be arranged at the interface between the first and second opening 80, 82.

Figure 6:
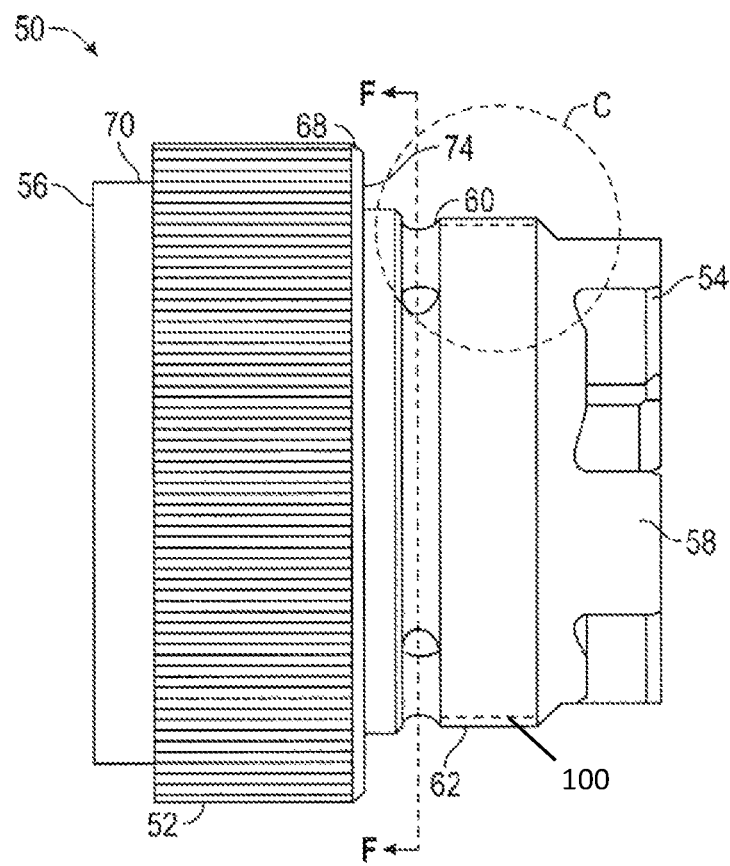
FIG. 6 is a side view of the disconnect shaft of FIG. 4 according to an embodiment of the invention.
Figure 12:
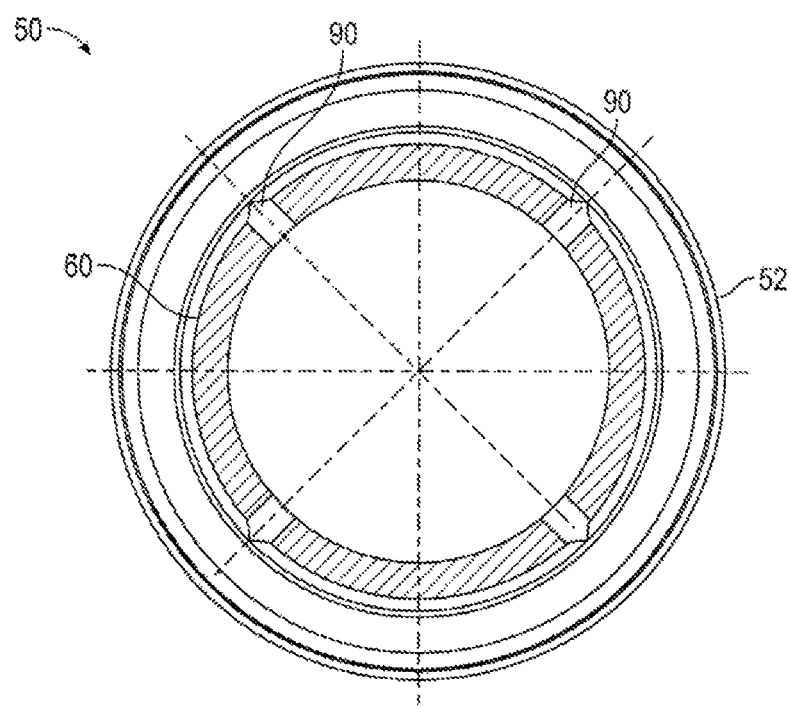
FIG. 12 is a section view of the disconnect shaft of FIG. 5 taken along line F-F according to an embodiment of the invention.

As shown in FIGS. 6 and 12, a plurality of holes 90 may be formed within the relief 60 of body 52. In the illustrated, non-limiting embodiment, the relief 60 includes four substantially equal and equidistantly spaced holes 90. In the illustrated, non-limiting embodiment, each hole 90 has a diameter of about 0.093±0.005 inches (0.236±0.0127 centimeters). A center of each hole 90 may be located at a distance parallel to the rotational axis of about 0.140 inches (0.3556 centimeters).

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A disconnect shaft of an integrated drive generator (IDG), comprising:
   a body configured to rotate about an axis of rotation and including:
      a first end;
      a second opposite end;
      a plurality of teeth formed adjacent the first end and configured to engage a complementary portion of an adjacent component; and
      a relief is formed in the body such that a first portion is defined between the relief and the plurality of teeth, the first portion including a plurality of threads having at least one of:
         a major diameter between about 1.3044 and about 1.3125 inches (3.313-3.334 centimeters);
         a minor diameter between about 1.2482 and about 1.2547 inches (3.170-3.187 centimeters);
         a pitch diameter between about 1.2765 and about 1.2800 inches (3.242-3.251 centimeters); and
         a root radius between about 0.0075 and 0.0090 inches (0.0190-0.0029 centimeters);
   wherein the plurality of teeth includes four substantially identical teeth, wherein each tooth extending about each 38°±1° of a circumference of the body, and a first surface of adjacent teeth are separated by 90 degrees; and
   wherein a chamfer is formed at the first end of the teeth, the chamfer extending outwardly at an angle of about 30°±2° such that a diameter of the chamfer at the first end is about 0.627±0.015 inches (1.593±0.0381 centimeters).

2. The disconnect shaft of claim 1, wherein a second portion of the body is arranged adjacent the relief, opposite the first portion, the second portion having an outer diameter between about 1.350+0.001−0.000 inches (3.429+0.00254−0.000 centimeters).

3. The disconnect shaft of claim 2, wherein a third portion of the body extends from adjacent the second portion to the second end, the third portion having an axial length parallel to the axis of rotation of about 0.697±0.005 inches (1.770±0.0127 centimeters) and an outer diameter adjacent the second end of about 1.500±0.005 inches (3.81±0.0127 centimeters).

4. The disconnect shaft according to claim 3, wherein the third portion of the shaft includes a plurality of outwardly extending splines.

5. The disconnect shaft of claim 2, wherein a chamfer is formed at an intersection between the relief and the first portion, the chamfer having an angle of about 45°±2°.

6. The disconnect shaft of claim 5, wherein a chamfer is formed at an intersection between the relief and the second portion, the chamfer having an angle of about 45°±52° such that a diameter of the body directly adjacent the relief is about 1.320±0.010 inches (3.353±0.0254 centimeters).

7. The disconnect shaft of claim 6, wherein an axial distance between a near edge of both the chamfer formed between the relief and the first portion and the chamfer formed between the relief and the second portion is about 0.070±0.010 inches (0.1178±0.0254 centimeters).

8. The disconnect shaft of claim 1, wherein an outer diameter defined by the plurality of teeth at the first end is about 1.200±0.005 inches (3.048±0.0127 centimeters), an inner diameter defined by the plurality of teeth at the first end is about 0.567±0.001 inches (1.440±0.00254 centimeters).

9. The disconnect shaft of claim 1, wherein a radius of about 0.047±0.005 inches (0.119±0.0127 centimeters) is formed adjacent at least one side of each of the plurality of teeth.

10. The disconnect shaft of claim 9, wherein an planar surface parallel to the first end extends between the plurality of the teeth, the planar surface being spaced from the first end of the teeth, parallel to the axis of rotation, by about 0.188±0.003 inches (0.478±0.0076 centimeters), and spaced from an adjacent side of one of the plurality of teeth by a distance of about 0.167 inches (0.424 centimeters), wherein an angled surface connects the planar surface with the radius, the angled surface extending at a length parallel to the axis of rotation of about 0.031±0.010 inches (0.079±0.0254 centimeters).

11. The disconnect shaft of claim 1, wherein a first interior opening is formed in the shaft, the first interior opening extend an axial distance parallel to the axis of rotation of about 597±0.010 inches (1.516±0.0254 centimeters) from the second end and defines an inner diameter of about 1.350±0.010 inches (3.429±0.0254 centimeters).

12. The disconnect shaft of claim 11, wherein a second interior opening is formed in the shaft adjacent the first interior opening, second interior opening extending an axial distance parallel to the axis of rotation of about 1.106±0.010 inches (2.809±0.0254 centimeters) and defining an inner diameter of about 1.050±0.010 inches (2.667±0.0254 centimeters).

* * * * *